Aug. 18, 1925.

J. TORLINSKI 1,549,818

ROTARY TOOL APPARATUS

Filed Feb. 7, 1925

Inventor

John Torlinski.

By Eccleston & Eccleston

Attorneys

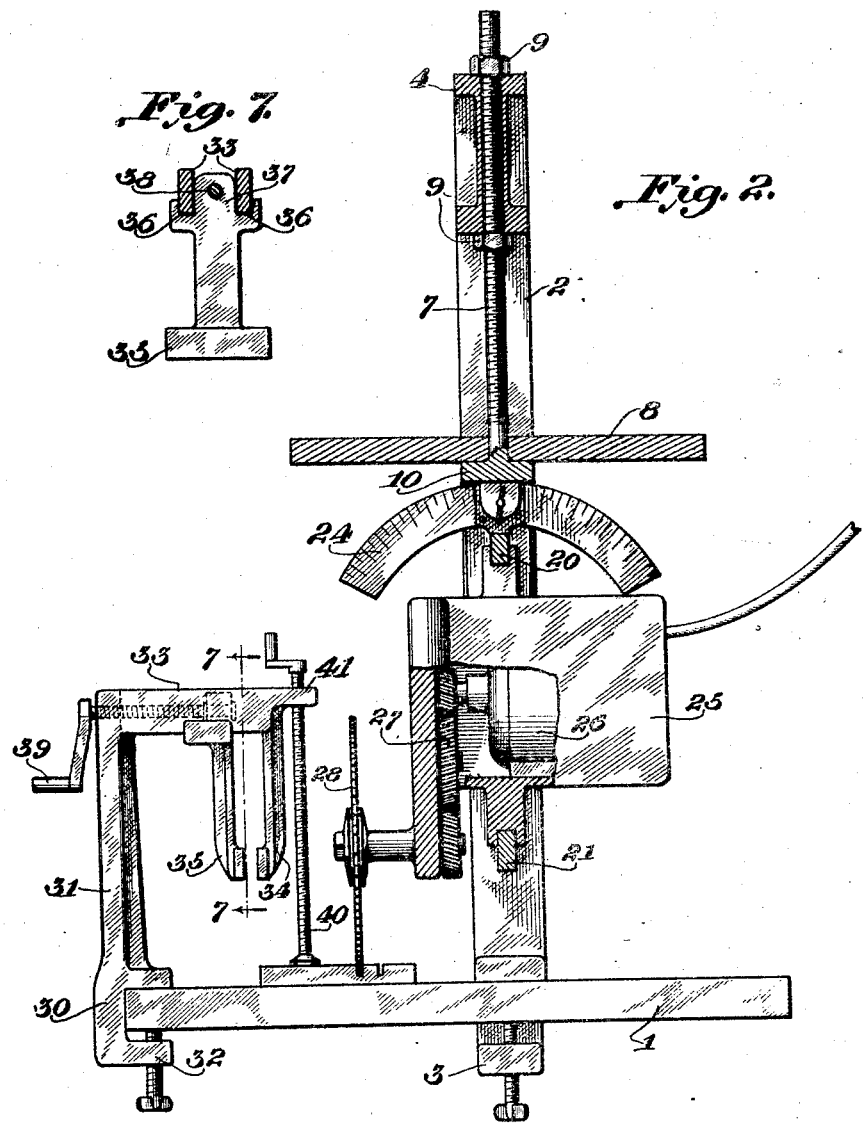

Aug. 18, 1925.
J. TORLINSKI
1,549,818
ROTARY TOOL APPARATUS
Filed Feb. 7, 1925    3 Sheets-Sheet 3
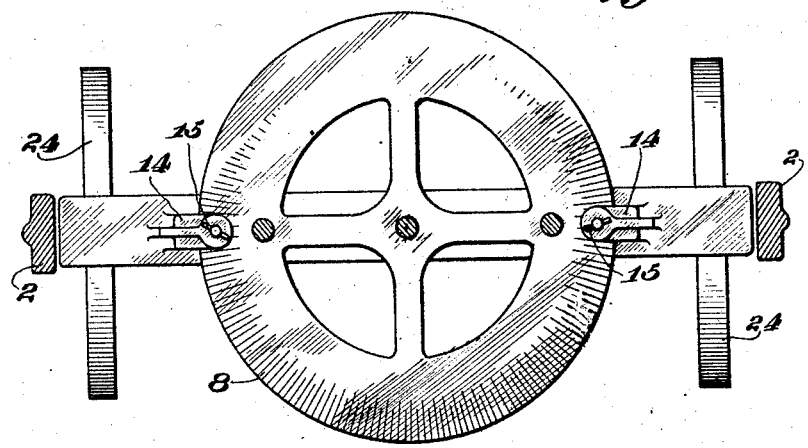
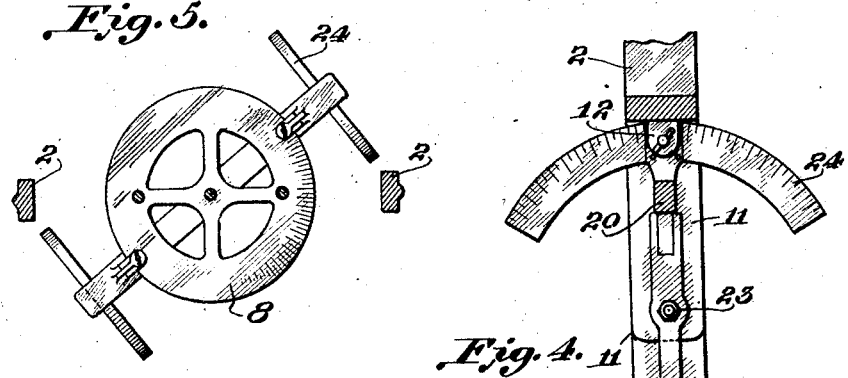
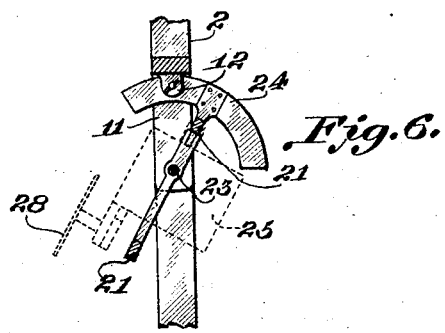
Inventor
John Torlinski.
By Eccleston & Eccleston
Attorneys Patented Aug. 18, 1925.

1,549,818

UNITED STATES PATENT OFFICE.

JOHN TORLINSKI, OF NANTICOKE, PENNSYLVANIA.

ROTARY-TOOL APPARATUS.

Application filed February 7, 1925. Serial No. 7,687.

*To all whom it may concern:*

Be it known that I, JOHN TORLINSKI, a citizen of the United States, residing at Nanticoke, in the county of Luzerne and State of Pennsylvania, have invented certain new and useful Improvements in Rotary-Tool Apparatus, of which the following is a full, clear, and exact description.

This invention relates to an apparatus for operating rotary tools and particularly to a sawing or woodworking machine and has special reference to a mitering machine in which a circular saw is employed.

An object of the invention consists in so mounting a circular saw or other rotary tool that the same may be bodily reciprocated, and in providing adjustments whereby the saw may be adjusted in both a vertical and horizontal plane so as to cut grooves at any angle desired. The invention in many respects is an improvement over the construction shown in my Patent No. 1,522,604, issued January 13, 1925.

A further object of the invention resides in the provision of a work holder for co-operation with the sawing apparatus which may be clamped to the work-table and which will hold the work edgewise in a vertical plane or flat against the work-table in a horizontal plane.

Other objects and advantages of the invention will be apparent from the following description when taken in connection with the accompanying drawings in which:

Figure 2 is a vertical sectional view, parts being broken away.

Figure 3 is a horizontal section taken on line 3—3 of Figure 1.

Figure 4 is a fragmentary vertical section taken on line 4—4 of Figure 1.

Figure 5 is a detail horizontal section showing the trackway adjusted in a horizontal plane at an angle to the main frame.

Figure 6 is a detail vertical section showing the trackway adjusted at an angle in a vertical plane, and Figure 7 is a vertical section through the work clamp taken on line 7—7 of Figure 2.

Figure 1:
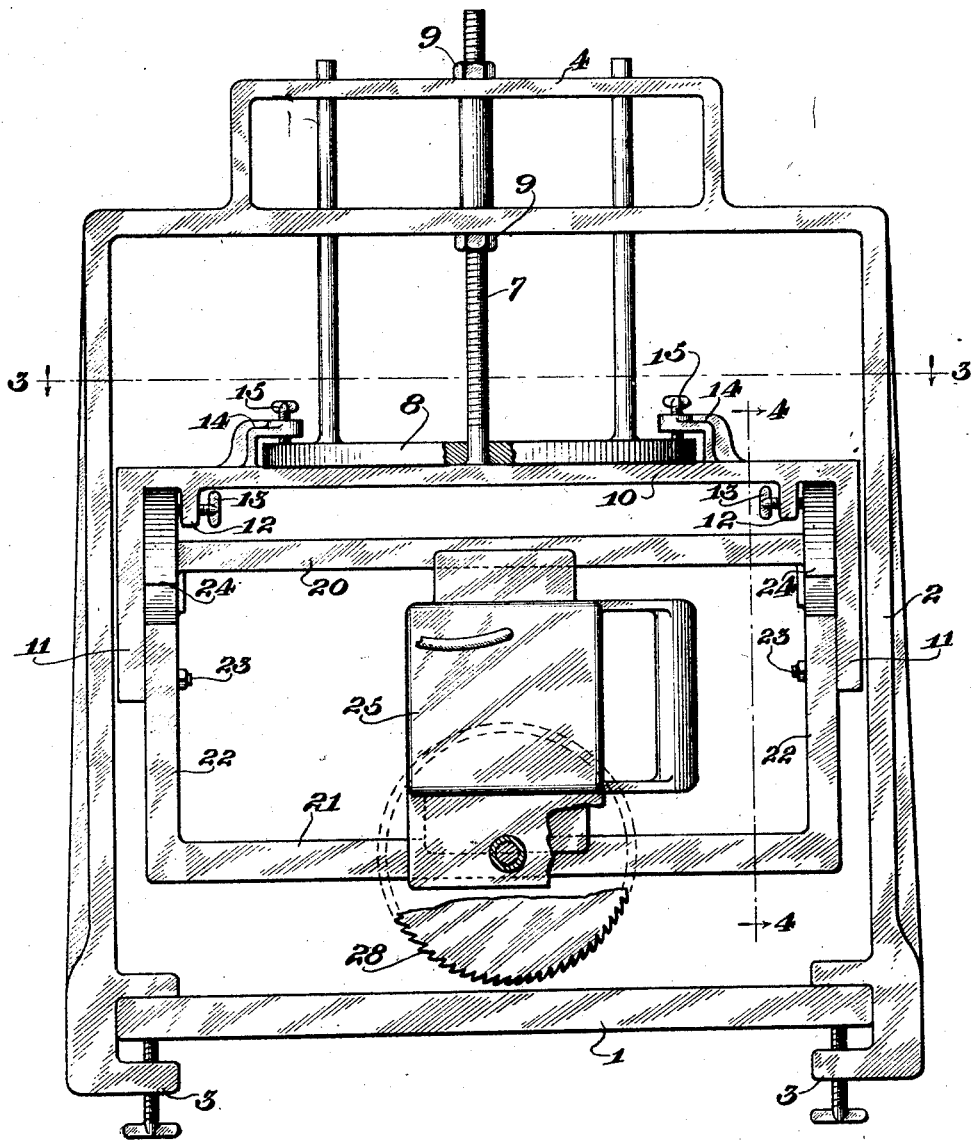
Figure 1 is a front elevation of the apparatus.

Referring to the drawings more in detail the numeral 1 refers to a work-table, carpenter's bench or the like to which the frame 2 of my sawing apparatus is adapted to be attached by means of ordinary clamps such as indicated by the numerals 3. The frame 2 is preferably of rectangular formation, having spaced vertical standards and is reinforced on its top rail by means of an arch 4 in order that it may sustain the necessary mechanism.

The top rail of the frame 2 as well as the arch 4 are formed with aligned openings in which are located the upper extensions 5 of a carrier 8 and an adjusting bolt 7. The body 8 of the carrier comprises a graduated disc having cut-out portions to lighten the same as shown in Figures 3 and 4, and from an inspection of Figures 1 and 2 it will be observed that the adjusting bolt 7 passes through the center of this disc and up through the top of the frame 2 and arch 4. The extensions 5, of course, are slidably mounted in the apertures above referred to and by means of nuts 9 the carrier may be locked in various adjusted positions in a vertical plane.

Rigidly connected to the lower end of the bolt 7 is a bracket 10 provided with the downwardly-extending arms 11 and adjacent lugs 12 carrying set screws 13, while the upper edge of the bracket is provided with L-shaped members 14 which overhang the disc 8 and carry set-screws 15 for engagement therewith. By means of the construction thus far described it will be apparent that the bracket 10 may be adjusted vertically through the medium of the bolt 7, and horizontally through the medium of set-screws 15 and disc 8.

Pivotally mounted within the bracket 10 is a trackway composed of upper and lower rails 20 and 21 respectively which are joined at their adjacent ends by means of the spacing members 22 which latter are integrally connected to the lower rail 21. These spacing members are pivotally connected to the downwardly-extending arms 11 of the bracket 10 by means of bolts 23 and thus form a horizontal pivot for the trackway. In order that the trackway may be locked in various adjusted positions about its pivot point the upper ends of the members 22 carry arc-shaped elements 24 which may be suitably graduated and which are disposed between the lugs 12 and the adjacent arm 11 of the bracket 10. By this construction it will be seen that the trackway may be adjusted on its pivot to the angle desired and then locked by engagement of the set-screws 13 with the arc-shaped elements 24.

This trackway which is formed of the rails 20 and 21 supports a carriage 25 in which is mounted a motor 26 and gearing 27 for operating the circular saw 28. It will be understood, of course, that while the saw is shown as operated by electricity it may also be operated by hand or other power as desired.

For the purpose of properly clamping the material to be cut or grooved I have provided an attachment for the work-table which is shown in Figures 2 and 7 and indicated generally by the numeral 30. This attachment includes a vertically extending standard or upright 31 which may be secured to the work-table by means of the clamp 32. A laterally extending arm 33 is formed on the upper end of the standard 31 and carries at its free end a downwardly-extending clamp element 34, which is adapted for cooperation with the clamp member 35 which is slidably mounted on the arm 33. The clamp element 35 is grooved at its upper end as indicated at 36 for reception of the two edges of the arm 33 which form a trackway therefor, and is provided with an extension 37 which extends upwardly between these edges. This extension is provided with an aperture for reception of the screw bolt 38 which is mounted in the upper end of the standard 31 and carries a handle 39 for its operation.

By the construction just described it will be clear that the material to be cut may be readily held in suspended position above the table by a proper manipulation of the handle 39 and bolt 38. For certain classes of work it is sometimes desirable to clamp the board or the like directly to the table and for this purpose I have provided a threaded bolt or vise 40 which is threaded through an aperture in the lug 41 which extends beyond the clamping element 34 and forms an integral part of the arm 33.

From the foregoing description taken in connection with the accompanying drawings it will be seen that I have devised an exceedingly simple yet reliable construction by which a rotary saw or other tool is universally adjustable, and also a novel construction for cooperation therewith by means of which the work may be easily and quickly suspended above the work table or clamped on the surface thereof.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A rotary tool mechanism including a frame having spaced vertical standards adapted to be clamped to a work-table, a carrier suspended in said frame for vertical adjustment, a downwardly-extending bracket connected to said carrier and adapted for adjustment in a horizontal plane, a trackway pivotally mounted on said bracket, and a tool mounted for reciprocation on said trackway.

2. A rotary tool mechanism including a frame having spaced vertical standards adapted to be clamped to a work-table, a carrier suspended from the upper part of said frame for vertical adjustment, a graduated disc forming a part of said carrier, a downwardly-extending bracket pivoted to said frame and connected to said disc, means for locking said bracket in various adjusted positions with respect to the disc, a trackway pivotally mounted on said bracket, means for locking said trackway in fixed position with respect to said bracket, and a tool mounted for reciprocation on said trackway.

3. A rotary tool mechanism including a frame having spaced vertical standards adapted to be clamped to a work-table, a carrier suspended from the upper part of said frame for vertical adjustment, a graduated disc fixed to the lower end of said carrier, a downwardly-extending bracket pivoted to said frame and connected to said disc, means for locking said bracket in various adjusted positions with respect to the disc, a trackway pivotally mounted on said bracket, an arc-shaped element carried by said trackway, means on said bracket for engaging said arc-shaped element to lock said trackway with respect to the bracket, and a tool mounted for reciprocation on said trackway.

JOHN TORLINSKI.